United States Patent
Kumar et al.

(10) Patent No.: US 6,848,426 B2
(45) Date of Patent: Feb. 1, 2005

(54) ADAPTIVE FUEL CONTROL FOR AN INTERNAL COMBUSTION ENGINE

(75) Inventors: Ajith Kuttannair Kumar, Erie, PA (US); John P. Dowell, Grove City, PA (US); Bret Dwayne Worden, Union City, PA (US); Gerald Edward Lacy, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/600,080

(22) Filed: Jun. 20, 2003

(65) Prior Publication Data

US 2004/0260451 A1 Dec. 23, 2004

(51) Int. Cl.$^7$ .......................... F02M 59/20; F02D 41/30
(52) U.S. Cl. ................. 123/480; 123/198; 123/357; 701/104
(58) Field of Search ............... 123/198 D, 333, 123/357, 358, 478, 480; 701/102–104

(56) References Cited

U.S. PATENT DOCUMENTS

| | | | |
|---|---|---|---|
| 4,789,939 A | | 12/1988 | Hamburg |
| 5,070,832 A | * | 12/1991 | Hapka et al. ............... 123/333 |
| 5,090,388 A | | 2/1992 | Hamburg et al. |
| 5,205,261 A | * | 4/1993 | Betts et al. ................ 123/494 |
| 5,819,196 A | | 10/1998 | Holmes et al. |
| 5,931,143 A | | 8/1999 | Kitagawa et al. |
| 6,102,005 A | | 8/2000 | Kasen et al. |
| 6,148,808 A | | 11/2000 | Kainz |
| 6,325,044 B1 | | 12/2001 | Chen et al. |
| 6,341,596 B1 | | 1/2002 | Dillen et al. |
| 6,453,665 B1 | | 9/2002 | Bower, Jr. et al. |
| 6,474,299 B1 | * | 11/2002 | Langer ....................... 123/352 |
| 6,493,627 B1 | * | 12/2002 | Gallagher et al. .......... 701/104 |
| 6,557,530 B1 | | 5/2003 | Benson et al. |
| 6,705,294 B2 | * | 3/2004 | Shinogle .................... 123/486 |
| 2003/0041843 A1 | | 3/2003 | Shinogle |

FOREIGN PATENT DOCUMENTS

JP     06173741     *  6/1994     ................ 123/495

* cited by examiner

*Primary Examiner*—Tony M. Argenbright
(74) *Attorney, Agent, or Firm*—Carl Rowold; David G. Maire; Beusse Brownlee Wolter Mora & Maire, P.A.

(57) ABSTRACT

An adaptive fuel limit function (52) for protecting an internal combustion engine. The adaptive fuel limit function is a learning function responsive to trends in an engine performance parameter such as compensated fuel consumption per unit of power produced (62). The engine performance parameter is processed through a low pass filter (64) to allow changes in a fuel limit signal (54) in response to gradual changes in the fuel demand, such as may be due to wear in the engine, while blocking changes in the fuel limit signal in response to sudden changes in the fuel demand, such as may be due to a cylinder failure. The difference between the input and the output of the low pass filter may be processed to identify a failure level (88) for providing an alarm function distinct from the learning function.

29 Claims, 5 Drawing Sheets

ADAPTIVE FUEL CONTROL FOR AN INTERNAL COMBUSTION ENGINE

BACKGROUND OF THE INVENTION

Fuel-injected internal combustion engines are used in many applications including the diesel-electric drive systems of railroad locomotives. FIG. 1 illustrates a load control system 10 for the electromotive drive system of a locomotive as provided by the assignee of the present invention. The engine is operated at a constant speed that is dependent upon a power demand (commonly referred to as the throttle notch setting) initiated by the locomotive operator. The speed is regulated to the speed command value 12 by adjusting the amount of fuel delivered to the engine. A speed regulator 14 generates a fuel demand signal 16 based upon the speed command 12 and an actual engine speed feedback signal 18. During normal operation, the fuel demand 16 is converted directly to fuel flow 20. However, under some conditions the amount of fuel 20 must be limited from that associated with the fuel demand 16 in order to prevent overloading of the engine and to accommodate failures of engine components and associated equipment. A fuel limit function 22 depends upon two different criteria. One is a static limit 24 based upon the current engine speed, temperature and pressure at various locations. The static limit 24 protects the engine and associated systems from mechanical overloading. A second criterion is a dynamic limit 26 required to meet transient limits such as smoke or other emissions or to account for the turbocharger lag. The lower of the static limit 24 and dynamic limit 26 is selected by a minimum function 28 as an input to the limit function 22 to limit the amount of fuel flow 20 when the fuel demand is higher. When the limit function 22 is active, the engine will receive less fuel than required to maintain the demand speed command 12 and the actual speed 18 will drop unless further control action is initiated. In order to prevent such a drop in actual engine speed 18, a load control function 30 senses the difference between the fuel flow 20 and the fuel demand 16 and provides a load reduction signal 32 to a minimum function 34 to be compared to operator demand signal 36. The operator demand signal is associated with the throttle notch setting and speed command 12. The minimum function 34 provides an output to the traction motor load control 38 to produce a load control signal 40 to control the alternator used to power the main locomotive traction motors. The reduced load imposed on the engine by the alternator counteracts the reduction in fuel flow 20 caused by the limit function 22, thereby allowing the engine actual speed 18 to be maintained consistent with the speed command 12, albeit at a lower than normal power output level.

The amount of fuel required to produce full horsepower does not remain constant over the life of an engine. Short-term variables such as ambient temperature, ambient pressure and fuel type/quality affect the amount of fuel used. Over the longer term, component wear will reduce the efficiency of an engine and will result in an increase in the amount of fuel used. Maintenance activities such as the replacement of parts will also change the amount of fuel used. The static limits 24 and dynamic limits 26 must be set sufficiently high to accommodate such short and long-term changes. In present locomotive engine designs, these limits may be set 50% above the initial fuel consumption level, to account for these changes.

A typical locomotive engine may have 12 or 16 cylinders. When one of the cylinders and/or the associated fuel delivery path fails, the prior art load control system 10 of FIG. 1 will increase the total fuel flow in order to maintain the desired engine speed on the remaining 11 or 15 cylinders. The static limit 24 ensures that the increased fuel flow is not so high as to cause immediate catastrophic failure of the engine. However, the increased fuel delivery to the remaining working cylinders will cause higher than normal stress, thereby causing higher overall failure rates on the affected components. Exhaust emissions may also be affected. Such failures are most likely to occur if the failure remains undetected by the operator and the engine is operated in this degraded mode for an extended period.

BRIEF DESCRIPTION OF THE DRAWINGS

The present invention may be understood with reference to the following drawings wherein like elements may be numbered consistently between drawings.

DETAILED DESCRIPTION OF THE INVENTION

Figure 1:
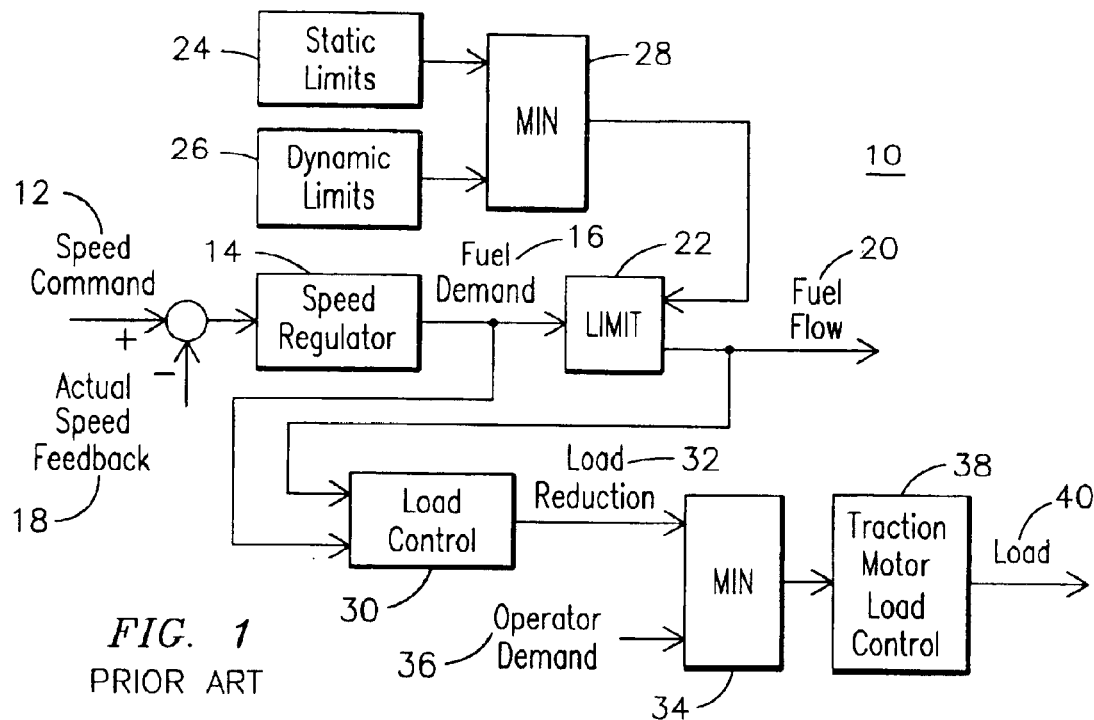
FIG. 1 is a block diagram of a prior art load control system for a locomotive.
Figure 2:
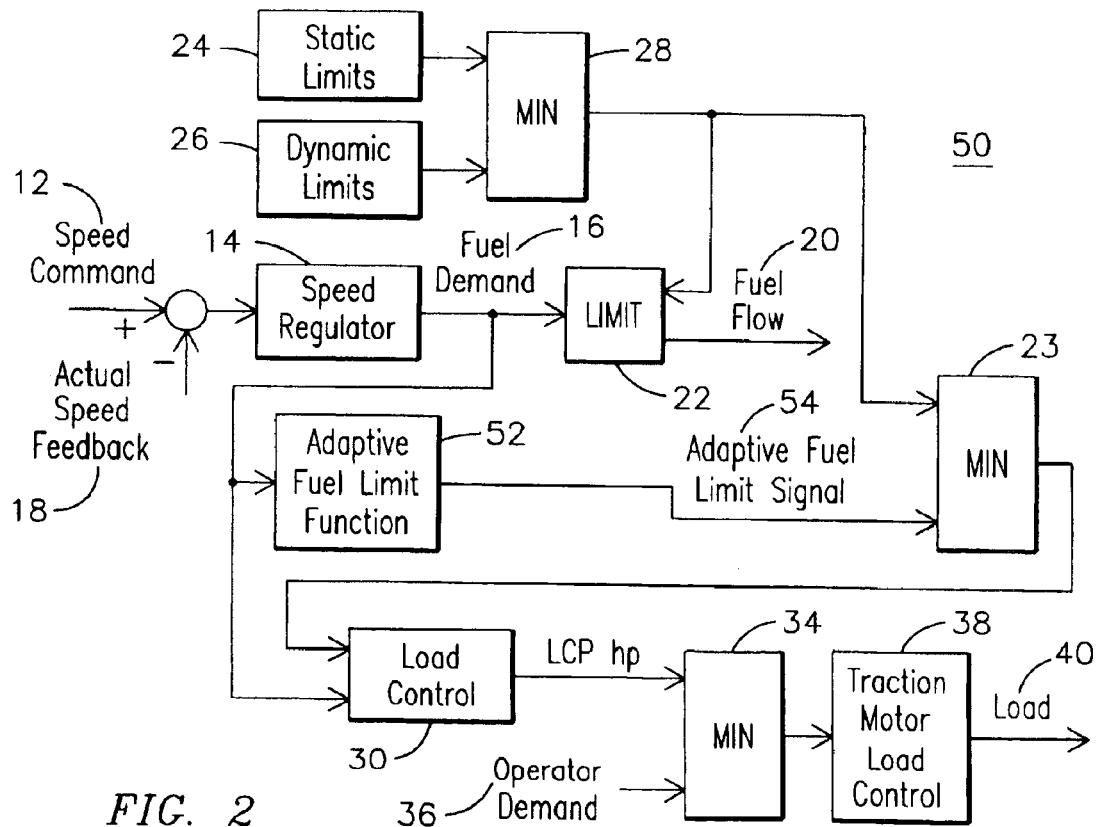
FIG. 2 is a block diagram of a load control system with one embodiment of an adaptive fuel limit.

FIG. 2 is a block diagram of one embodiment of an improved load control system 50 as may be used in a locomotive or other electromotive drive system. In this system 50, the speed regulator function 14 and fuel limit control function 24, 26, 28 are the same as the prior art system illustrated in FIG. 1. In addition, the load control system 50 of FIG. 2 includes an adaptive fuel limit function 52 that will reduce the load on the engine in the event of a failure that causes a sudden increase in the fuel demand under nominally steady-state operation, such as the failure of an engine cylinder or its associated fuel delivery system. This reduced engine load will result indirectly in a lowered fuel flow 20. The adaptive fuel limit 52 functions to provide a limitation on fuel flow 20 that may be lower than the limits imposed by static limit 24 and dynamic limits 26, thereby further protecting the engine. The adaptive fuel limit function 52 is responsive to the operating history of the engine to vary the maximum allowed fuel flow in response to a parameter indicative of performance of the engine over time, as will be described more fully below. The adaptive fuel limit function 52 generates an adaptive fuel limit signal 54 that is compared to the output of minimum function 28 by minimum function 23 to provide an input to load control 30. When the fuel demand 16 is greater than the adaptive fuel limit signal 54, the load control 30 will reduce the load on the engine accordingly to achieve a steady state condition.

Figure 3:
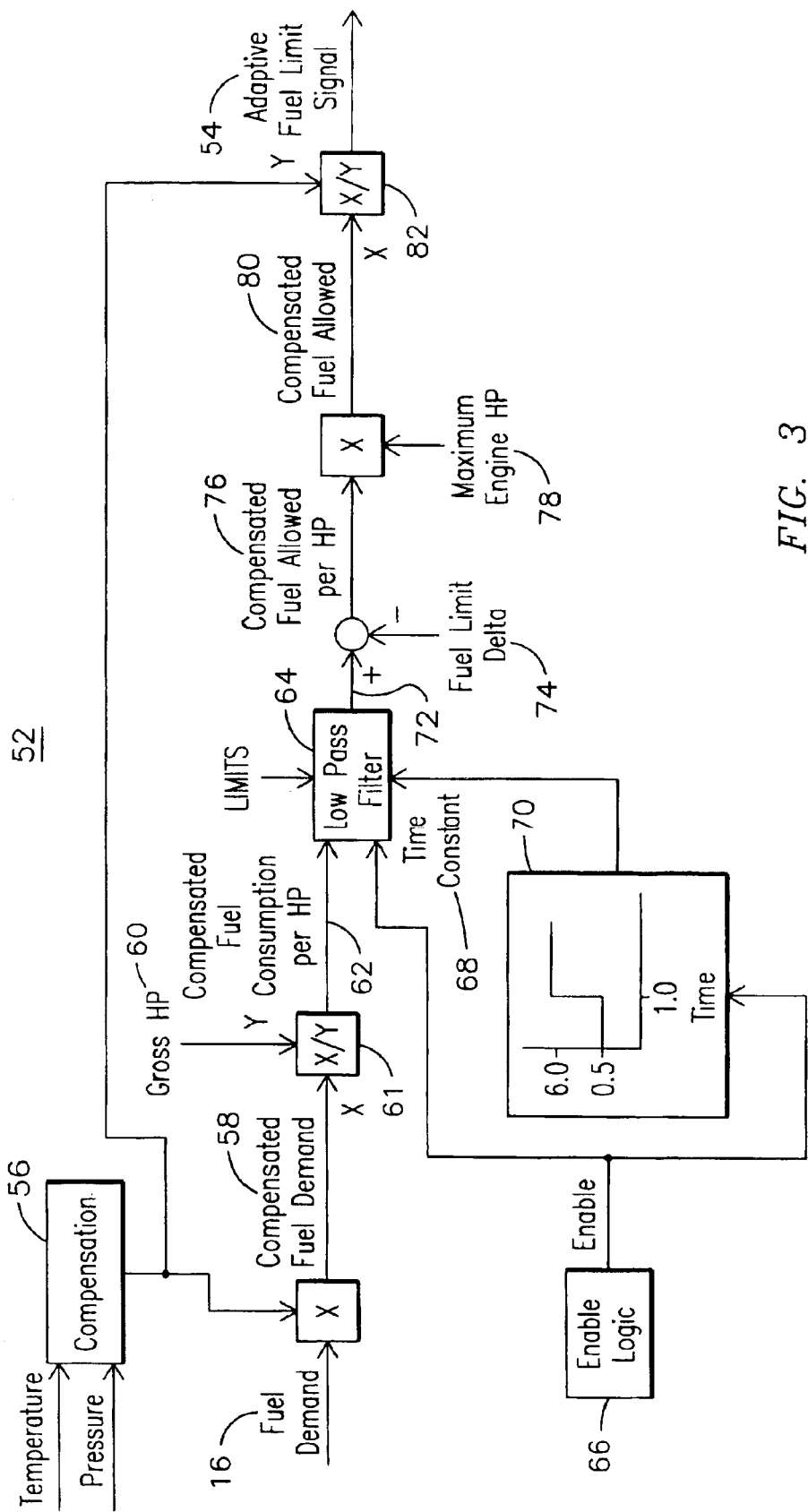
FIG. 3 is a block diagram of one embodiment of the adaptive fuel limit function of FIG. 2.

FIG. 3 illustrates one embodiment of a block diagram for the adaptive fuel limit function 52. The adaptive fuel limit function 52 exploits the fact that performance degradation due to component wear occurs over a long period of time, whereas component failures typically occur suddenly. The adaptive fuel limit function 52 implements an algorithm to adjust the adaptive fuel limit 54 based upon information obtained when the engine is healthy, and it ignores information generated during a component failure transient. The fuel demand signal 16 obtained from the speed regulator 14 (FIG. 1) is received as an input. The fuel demand 16 may be compensated for variables such as fuel quality or environmental conditions such as ambient humidity, temperature and pressure by a compensation function 56 to derive a compensated fuel demand 58. One known method of compensating for ambient temperature and pressure is to multiply the fuel demand 16 by $$1/(((0.0005386*T)+0.96768)*(14.135/P)^{0.093})$$

where T is temperature in degrees F and P is absolute pressure in pounds per square inch. The compensated fuel demand 58 is then divided by the actual power being produced (e.g. gross horsepower) 60 in calculator 61 to derive a fuel usage/unit of performance parameter, such as compensated fuel consumption per horsepower 62. One may appreciate that other such parameters may be used in other embodiments, for example, rate of fuel flow per horsepower produced by the engine, rate of fuel flow per engine stroke, rate of fuel flow per unit of speed of the engine; or rate of fuel flow per unit of torque produced by the engine. Such performance parameters will change slowly over time as the engine components wear. Other parameters responsive to performance of the engine over time that are not direct measures of fuel usage may be used in the adaptive fuel limit function, for example, parameters based upon an engine emission, temperature, pressure, humidity or flow rate of a fluid other than fuel.

The compensated fuel consumption per horsepower signal 62 is filtered through an averaging function such as a low pass filter 64 to pass the slow changes due to component wear and to block the more rapid changes due to component failure. The output 72 of the low pass filter is a filtered fuel consumption per unit power signal. In one embodiment the filter 64 may be enabled by enablement logic 66, for example only when the engine is near its full speed and full horsepower and is not being limited by any of the fuel limits 24, 26. It is possible to enable the adaptive fuel limit function 52 at other engine speeds and/or power output levels. The low pass filter 64 will learn the engine characteristics over a period of time dependent upon a time constant 68 that may be varied by selected logic 70. For example, the time constant may be set to a low value, such as 0.5 hours, at the initial commissioning of the engine or at any time after an engine maintenance has been performed or at any time when it is known that the engine is fully healthy. This allows rapid learning of the adaptive fuel limit function 52 via rapid changes to the output 72 of the low pass filter 64. When the enabled time exceeds a predetermined time, for example 1.0 hours, the time constant 68 may be set to a larger value, for example 6.0 hours. These times are set to obtain a rapid adaptation during a healthy period of the engine, and then to allow the output 72 to account for slow changes such as component wear. Alternatively, a linear or other change in the time constant 68 may be selected, or the time constant itself may remain constant.

The output 72 of the low pass filter 64 may then be augmented by a selected amount, such as a fuel limit delta 74 of 3% for example, to derive the compensated fuel allowed per horsepower 76. The fuel limit delta 74 may purposefully be selected to be less than the change in fuel flow expected when one cylinder fails in order to provide protection to the engine under that scenario. This value is multiplied by the maximum engine power output 78 to derive the compensated fuel allowed 80 and re-compensated for ambient temperature and pressure 82 to derive the adaptive fuel limit signal 54. The learned fuel levels are normalized to standard temperature and pressure (compensated) conditions. This compensation is used to eliminate the effect of the natural variation in fuel flow associated with changes in ambient conditions. This memory of fuel level must be adjusted to a level appropriate for the current temperature and pressure since the present fuel limits are incorporated in uncompensated units.

It is also possible to compensate fuel demand and limits before applying the limits in limit function 22 and then to re-compensate the output of limit function 22. This will account for variations in the environmental conditions without incorporating such uncertainty in the static limits 24, thereby reducing the margin required. This decrease in margin will result in a lower fuel flow 20 under certain circumstances.

Figure 4:
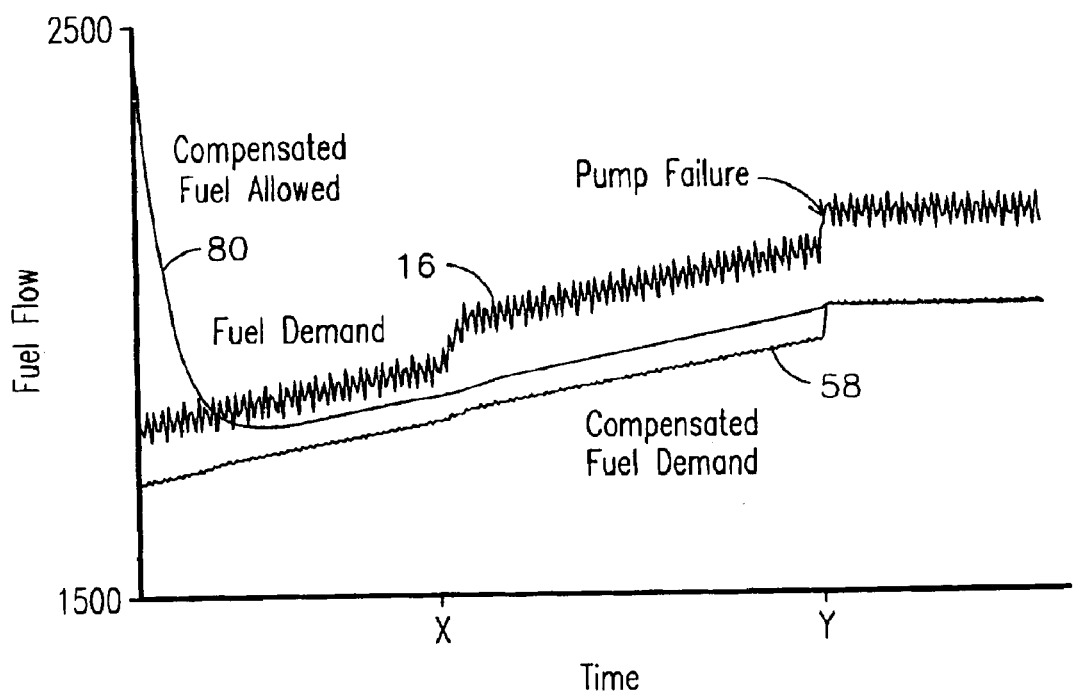
FIG. 4 is a graph of fuel flow variables over time for the load control system of FIG. 2 utilizing the adaptive fuel limit function of FIG. 3.

FIG. 4 is a graph of several variables of the adaptive fuel limit function 52 of FIG. 2. The fuel demand 16 and compensated fuel demand 58 are the raw fuel usage signals that can be seen to rise gradually over time as the engine wears. At time X there is a relatively sudden increase in the fuel demand 16, such as may be due to a change in ambient conditions or a change in the fuel supply. This sudden change if fully compensated will show no changes in the compensated fuel demand. However, practically there could be some error in the compensation and that is reflected in the compensated fuel demand 58 as a very small change at time X.

The compensated fuel allowed 80 is initiated at a maximum fuel limit value that may correspond to the static limit 24. As the adaptive fuel limit function 52 learns from the actual fuel usage of the engine, the compensated fuel allowed 80 is reduced at a rate controlled by the time constant 68 until it generally corresponds to compensated fuel demand 58 plus the fuel limit delta 74. The compensated fuel allowed 80 is then adjusted, increased in this example, in response to a trend in performance of the engine as the engine wears over time. In this manner the adaptive fuel limit 54 is more effective than the prior art static limit 24 since it can be set much closer to the actual fuel consumption level than is the static limit 24. As stated above, the static limit 24 may be as high as 50% above the initial fuel consumption level, whereas the compensated fuel allowed 80 very quickly approaches only about 3% above the actual fuel consumption level, and yet it is free to increase as the engine wears. In fact, the compensated fuel demand 58 can increase slowly to values that exceed earlier values of the compensated fuel allowed 80, as may be appreciated by viewing these respective values at times X and Y.

At time Y there is a fuel pump failure or other component failure that suddenly decreases the power output from one of the engine cylinders. The resulting increase in the compensated fuel demand 58 is limited to about 3% by the compensated fuel allowed limit 80, since further increases in the compensated fuel demand 58 are made unnecessary by corresponding decreases in the load 40 generated by load control 30. There may be a very short spike in fuel demand that would exceed this amount until the adaptive limit function can respond, however, such spike is not visible in the scale of FIG. 4 which may be on a scale of days or months. When such an event occurs, the adapted learning is stopped.

Figure 5:
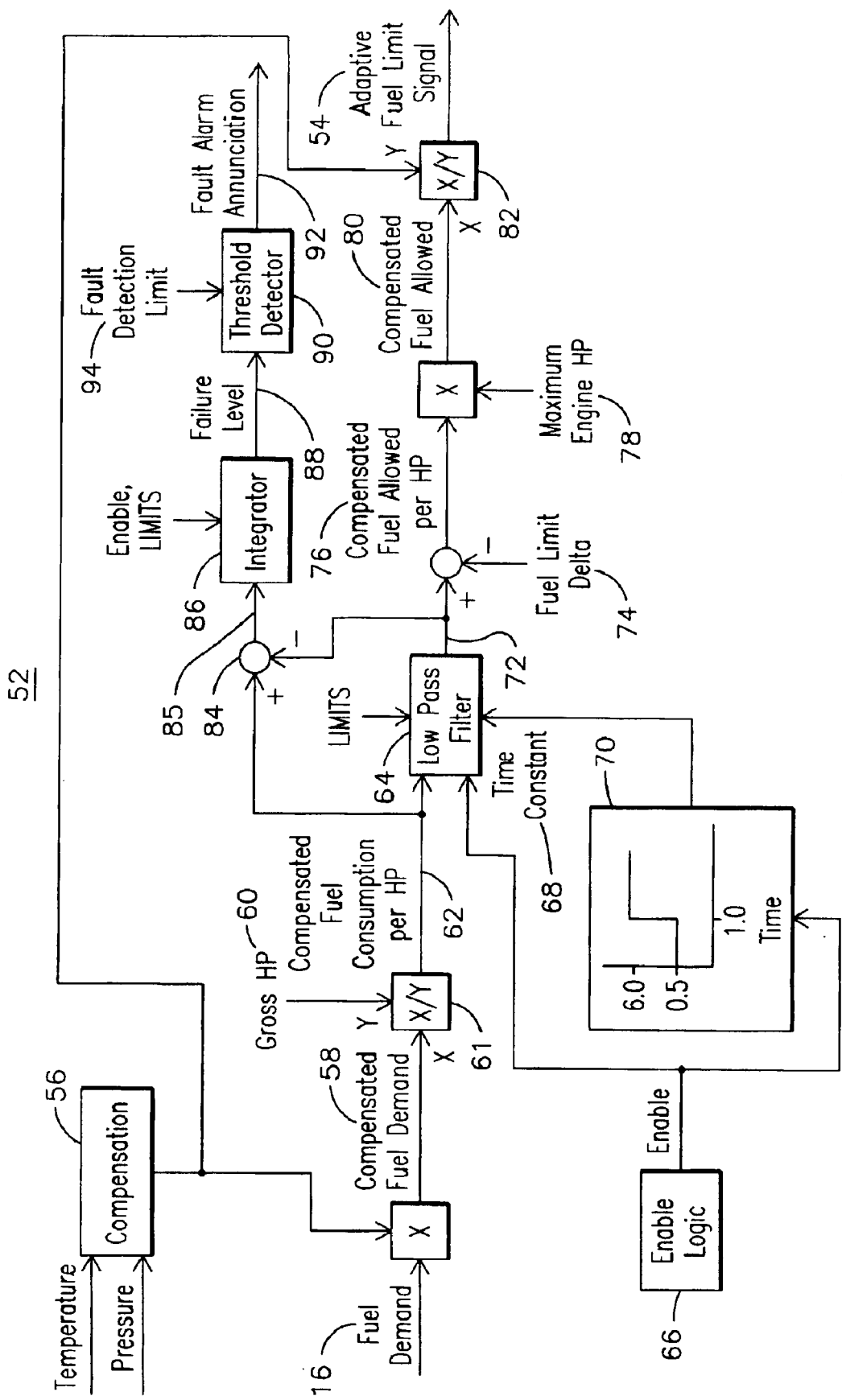
FIG. 5 is a block diagram of a further embodiment of the adaptive fuel limit function of FIG. 2.

FIG. 5 illustrates a further embodiment of an adaptive fuel limit function wherein an alarm/annunciation function is provided separate from the fuel limit function. In this embodiment, the fuel limit delta function 74 may be set to any arbitrary value and may purposefully be set to a value that is higher than the change expected with one cylinder failed. This approach will allow the engine to maintain its rated power output with N–1 cylinders generating power, and it will provide an alarm to the operator or maintainer so that the failure is noticed and the operator can take whatever action is appropriate. For example, the operator may elect to keep the engine operating at full power if the locomotive is operating along a section of track having a steep grade and where full power is critically important. The operator may also elect to run the engine at full power until a convenient time for performing maintenance. Alternatively, in order to eliminate excess stress on the engine components, the operator may elect to reduce the power demand 36 by lowering the notch setting in situations where a reduced power level is safe and economically acceptable. Other situations may suggest a relatively high fuel limit delta function 74, for example when there is a large amount of noise or variation in the fuel demand that is not accounted for in the compensation function 56. At the time of a maintenance activity or when parts are replaced, the operator or maintainer may reset the compensated fuel allowed to the maximum or new engine condition, or the algorithm may be allowed to learn from its current setting. It is also possible to implement a fast-learn session after such maintenance activity.

As seen in FIG. 5, comparator 84 is used to derive a difference signal 85 based upon the difference between the input to and the output from the low pass filter 64. In one embodiment, integrator 86 is enabled together with the low pass filter. Integrator 86 may have its input slightly biased to account for any error or offset in the evaluation, and it may be clamped so that only one polarity output is possible. This integrator rejects zero mean variation in the fuel demand above the fuel limit, yet migrates in the positive direction when the average fuel level exceeds the limit. The output of the integrator 86 is a failure level 88 that is indicative of a failure of a cylinder or other sudden degradation. The failure level 88 may be used as an indicator in its raw state or it may be filtered through a threshold detector 90 to produce a fault alarm or annunciation 92. The failure level 88 or fault alarm 92 may be used to stop the adaptation algorithm based upon the number of failures or other criterion and/or it may be used to limit the fuel flow.

Figure 6:
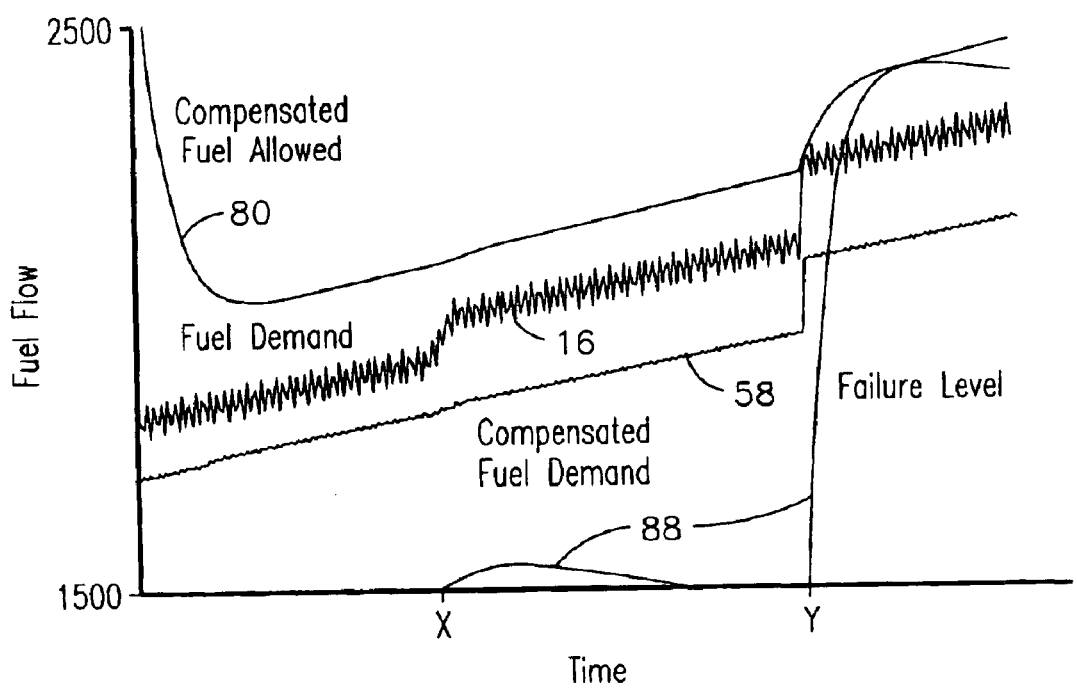
FIG. 6 is a graph of fuel flow variables over time for the load control system of FIG. 2 utilizing the adaptive fuel limit function of FIG. 5.

FIG. 6 is a graph of several of the variables of a load control system utilizing the adaptive fuel limit of FIG. 5. In this embodiment, the fuel limit function 74 is set high enough so that the compensated fuel allowed 80 does not limit the fuel in the event of a single cylinder failure, and the engine is allowed to produce full horsepower. The output of the failure sensing integrator 86 indicates a rapid increase in failure level 88 that will exceed the preset fault detection limit 94 of threshold detector 90, thereby providing an alarm to the operator without reducing the output of the engine. The compensated fuel allowed 80 will learn the new fuel consumption rate of the engine and it remains available as a limit for protecting the engine against even larger sudden fuel demand increases.

The various logic and control functions of the present invention may be embodied as a data structure or propagated signals and may be resident on hardware, software, firmware or combinations thereof. Instructions for accomplishing the method of the present invention may be resident on any computer-readable medium known in the art for causing a computer system to implement the routine of the present invention, such as but not limited to static or dynamic memory devices, computer hard drive, floppy disk, or it may be made accessible via an application service provider. The typical prior art load control system of FIG. 1 may be modified by hardware/firmware/software upgrades to add the additional functions shown in FIG. 2 in order to incorporate the present invention on an existing system.

Figure 7:
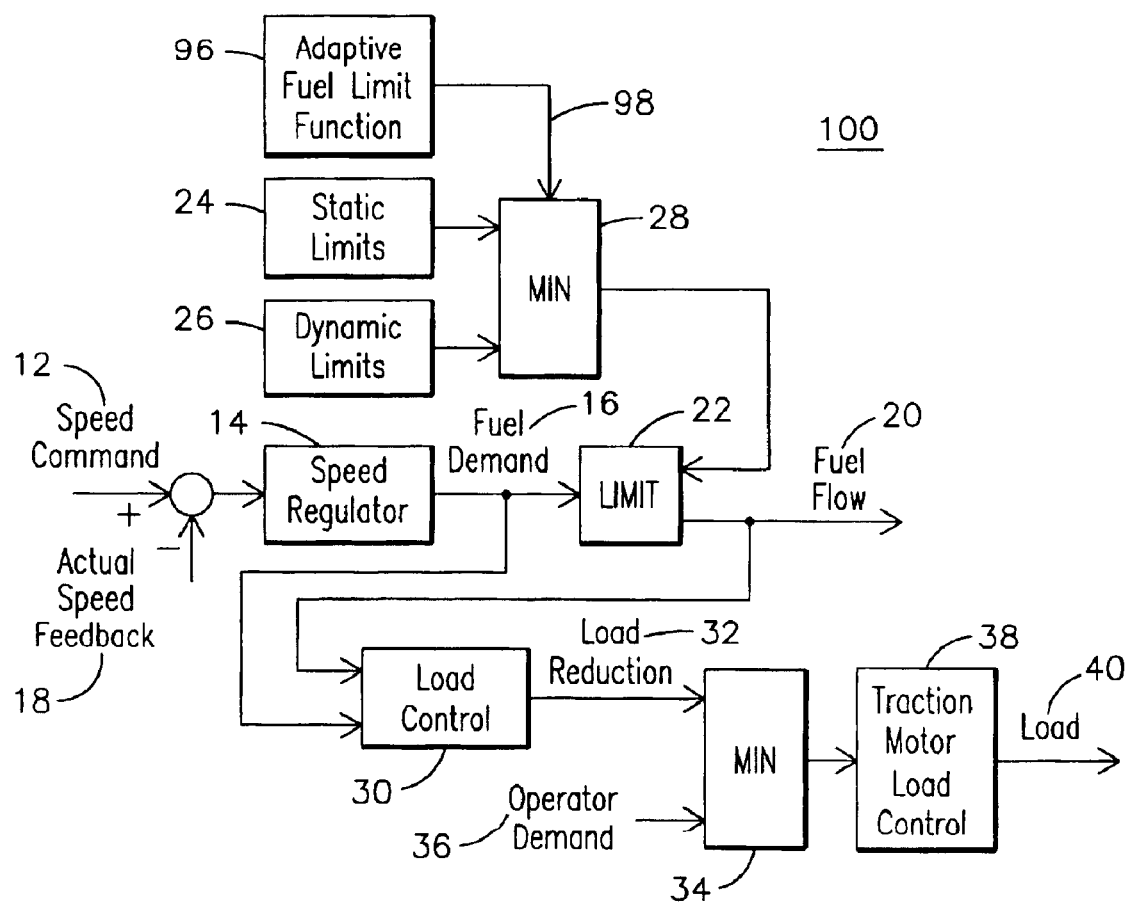
FIG. 7 is a block diagram of an alternative embodiment of a load control system utilizing an adaptive fuel limit function.

Other embodiments of adaptive fuel/load control systems may be envisioned. For example, FIG. 7 illustrates an alternative embodiment of a load control system 100 utilizing an adaptive fuel limit function 96. In this embodiment, a control function such as the limit function 22 will control/limit the fuel flow 20 directly in response to the derived adaptive fuel limit signal 98 in the event of a sudden increase in the fuel demand. This is in contrast to the embodiment of FIG. 2 wherein the control function that limits the fuel flow does so indirectly through the load control function 30. The adaptive fuel limit function 96 may be similar to the adaptive fuel limit function 52 of FIG. 3 or it may be any other suitable learning function responsive to historical engine performance data to produce an adaptive fuel limit signal. The engine performance data may be measured as a parameter responsive to fuel usage per unit of performance. In the embodiment of FIG. 7, the operation of the adaptive fuel limit function 96 may cause the fuel flow 20 to drop below the flow required to produce the full power or speed demanded, in which case the load control function 30 will automatically compensate by reducing the load on the engine.

While the preferred embodiments of the present invention have been shown and described herein, it will be obvious that such embodiments are provided by way of example only. Numerous variations, changes and substitutions will occur to those of skill in the art without departing from the invention herein. It is intended that the invention be limited only by the spirit and scope of the appended claims.

We claim:

1. A method of controlling fuel flow to prevent an overload of an internal combustion engine as the engine ages, the method comprising:
   limiting fuel flow delivered to the engine to a maximum allowed value in order to prevent an undesirable operating condition for the engine; and
   adjusting the fuel flow maximum allowed value in response to a trend in performance of the engine over time; and
   varying the maximum allowed value in response to a fuel usage parameter.

2. The method of claim 1, further comprising varying the maximum allowed value in response to fuel usage per unit of performance of the engine.

3. The method of claim 2, further comprising determining a fuel usage per unit of performance parameter as one of rate of fuel flow per horsepower produced by the engine, rate of fuel flow per engine stroke, rate of fuel flow per unit of speed of a vehicle propelled by the engine; and rate of fuel flow per unit of torque produced by the engine.

4. The method of claim 3, further comprising normalizing fuel usage as a function of an environmental condition.

5. A method of controlling fuel flow to prevent an overload of an internal combustion engine as the engine ages, the method comprising:
   limiting fuel flow delivered to the engine to a maximum allowed value in order to prevent an undesirable operating condition for the engine;
   adjusting the fuel flow maximum allowed value in response to a trend in performance of the engine over time; and applying a low pass filter to a parameter indicative of performance of the engine over time to enable variation of the maximum allowed value in response to engine wear and to prevent variation of the maximum allowed value in response to engine component failure.

6. A method of controlling fuel flow to prevent an overload of an internal combustion engine as the engine ages, the method comprising:
limiting fuel flow delivered to the engine to a maximum allowed value in order to prevent an undesirable operating condition for the engine;
adjusting the fuel flow maximum allowed value in response to a trend in performance of the engine over time; and
applying an averaging function to a parameter indicative of performance of the engine over time to enable adjustment of the maximum allowed value in response to engine wear and to prevent adjustment of the maximum allowed value in response to engine component failure.

7. The method of claim 6, further comprising providing an alarm responsive to a difference between an input to the averaging function and an output of the averaging function.

8. A method of controlling fuel flow to prevent an overload of an internal combustion engine as the engine ages, the method comprising:
limiting fuel flow delivered to the engine to a maximum allowed value in order to prevent an undesirable operating condition for the engine;
adjusting the fuel flow maximum allowed value in response to a trend in performance of the engine over time; and
varying the maximum allowed value in response to an output of a learning function responsive to performance of the engine.

9. The method of claim 8, further comprising applying a variable time constant to the learning function.

10. The method of claim 8, further comprising applying the output of the learning function to a fuel control function.

11. The method of claim 8, further comprising applying the output of the learning function to an engine load control function.

12. In a fuel control system for an internal combustion engine of a locomotive wherein fuel flow is controlled to be responsive to a demand signal and wherein fuel flow is limited to be no more than a maximum allowed fuel flow value in order to prevent the occurrence of an undesirable operating condition, a method comprising varying the maximum allowed fuel flow value over time in response to a measured parameter;
and further comprising varying the maximum allowable fuel flow value in response to an engine performance parameter.

13. The method of claim 12, further comprising varying the maximum allowable fuel flow value in response to fuel usage per unit of engine performance.

14. The method of claim 12, further comprising varying the maximum allowable fuel flow value in response to fuel usage compensated for an environmental condition per unit of engine performance.

15. The method of claim 13, further comprising varying the maximum allowable fuel flow value in response to one of rate of fuel flow per horsepower produced by the engine, rate of fuel flow per engine stroke, rate of fuel flow per unit of speed of the engine; and rate of fuel flow per unit of torque produced by the engine.

16. In a fuel control system for an internal combustion engine of a locomotive wherein fuel flow is controlled to be responsive to a demand signal and wherein fuel flow is limited to be no more than a maximum allowed fuel flow value in order to prevent the occurrence of an undesirable operating condition, a method comprising varying the maximum allowed fuel flow value over time in response to a measured parameter;
further comprising varying the maximum allowable fuel flow value in response to a change in an engine performance parameter that passes a low pass filter.

17. The method of claim 16, further comprising alarming a change in the engine performance parameter that is filtered by the low pass filter.

18. A method of controlling fuel flow to an internal combustion engine, the method comprising:
establishing a maximum allowed fuel flow value for the engine;
measuring an engine performance parameter;
applying a learning function to the engine performance parameter; and
using an output of the learning function to determine a variation in the maximum allowed fuel flow value.

19. The method of claim 18, further comprising applying a variable time constant to the learning function.

20. The method of claim 18, further comprising applying an averaging function to the engine performance variable to enable changes to the maximum allowed fuel flow value in response to engine wear and to prevent changes to the maximum allowed fuel flow value in response to an engine component failure.

21. The method of claim 20, further comprising detecting an engine performance variable change that is blocked by a low pass filter.

22. A method of controlling an engine, the method comprising:
limiting fuel flow delivered to the engine to a maximum allowed value in order to avoid an undesirable operating condition for the engine;
varying the maximum allowed value in response to a variation in an ambient environmental condition affecting performance of the engine; and
applying a learning function to the maximum allowed value.

23. An apparatus for controlling an internal combustion engine, the apparatus comprising:
a regulator responsive to a demand signal and to a feedback signal to produce a fuel demand;
a fuel limiter responsive to historical engine performance data to produce an adaptive fuel limit;
a controller responsive to the adaptive fuel limit and the fuel demand to control fuel flow;
wherein the fuel limiter further comprises:
a calculator responsive to the fuel demand signal and an engine power signal to produce a fuel consumption per unit power signal;
a low pass filter responsive to the fuel consumption per unit power signal to produce a filtered fuel consumption per unit power signal; and
a multiplier responsive to the filtered fuel consumption per unit power signal and to a maximum power rating signal to produce a fuel limit signal.

24. The apparatus of claim 23, further comprising:
a comparator responsive to the fuel consumption per unit power signal and the filtered fuel consumption per unit power signal to produce a difference signal; and an integrator responsive to the difference signal to produce a failure level signal.

25. The apparatus of claim 24, further comprising a threshold detector responsive to the failure level signal to produce a fault alarm.

26. A computer-readable medium containing instructions for causing a computer system to control fuel flow to prevent an overload of an internal combustion engine as the engine ages by:

limiting fuel flow delivered to the engine to a maximum allowed value in order to prevent an undesirable operating condition for the engine; and adjusting the fuel flow maximum allowed value in response to a trend in performance of the engine over time;

and further comprising instructions for causing the computer system to vary the maximum allowed value in response to a fuel usage parameter.

27. The computer-readable medium of claim 26, further comprising instructions for causing the computer system to vary the maximum allowed value in response to fuel usage per unit of performance of the engine.

28. The computer-readable medium of claim 27 further comprising instructions for causing the computer system to determine a fuel usage per unit of performance parameter as one of rate of fuel flow per horsepower produced by the engine, rate of fuel flow per engine stroke, rate of fuel flow per unit of speed of a vehicle propelled by the engine; and rate of fuel flow per unit of torque produced by the engine.

29. The computer-readable medium of claim 28 further comprising instructions for causing the computer system to normalize fuel usage as a function of an environmental condition.

* * * * *